United States Patent [19]  [11]  4,295,672
Williams  [45]  Oct. 20, 1981

[54] FLEXIBLE TUBE TERMINATING MEANS

[76] Inventor: Robert A. Williams, 2721 White Settlement Rd., Fort Worth, Tex. 76107

[21] Appl. No.: 38,650
[22] Filed: May 14, 1979
[51] Int. Cl.³ .............................................. F16L 13/08
[52] U.S. Cl. .................................. 285/287; 228/132; 228/249; 285/416; 285/386
[58] Field of Search ............... 285/287, 416, 386, 354; 228/126, 132, 133, 165, 167, 245, 249, 250, 251

[56] References Cited
U.S. PATENT DOCUMENTS

| | | | |
|---|---|---|---|
| 1,515,750 | 11/1924 | Pasman | 285/287 |
| 2,148,746 | 2/1939 | Hampe et al. | 285/287 |
| 2,312,579 | 3/1943 | O'Brien | 285/287 X |
| 2,346,413 | 4/1944 | Broecker | 228/132 |
| 3,414,001 | 12/1968 | Woodford | 285/287 X |
| 4,117,201 | 9/1978 | Kelfert | 285/416 |

FOREIGN PATENT DOCUMENTS 415201 12/1966 Switzerland .................... 285/416

Primary Examiner—Dave W. Arola

[57] ABSTRACT

A flexible tube terminating means comprising a fitting connected around the end portion of a flexible tube and having a shoulder for engagement by an annular threaded coupling member located around the tube. The fitting is formed by one member which engages the end of the tube and holds a second member in place while both members are brazed together and to the tube by solder located in an annular cavity formed between the two members and around the tube.

8 Claims, 3 Drawing Figures

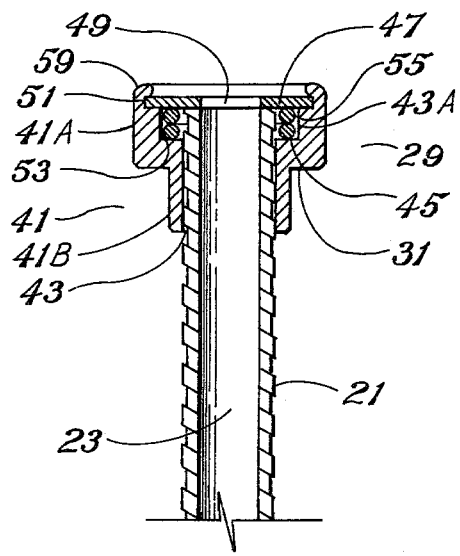
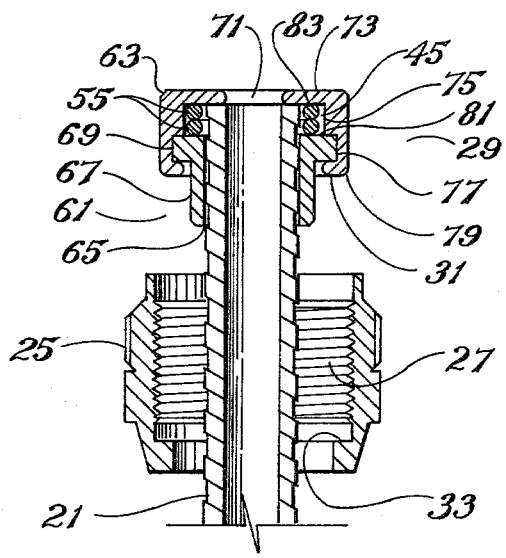
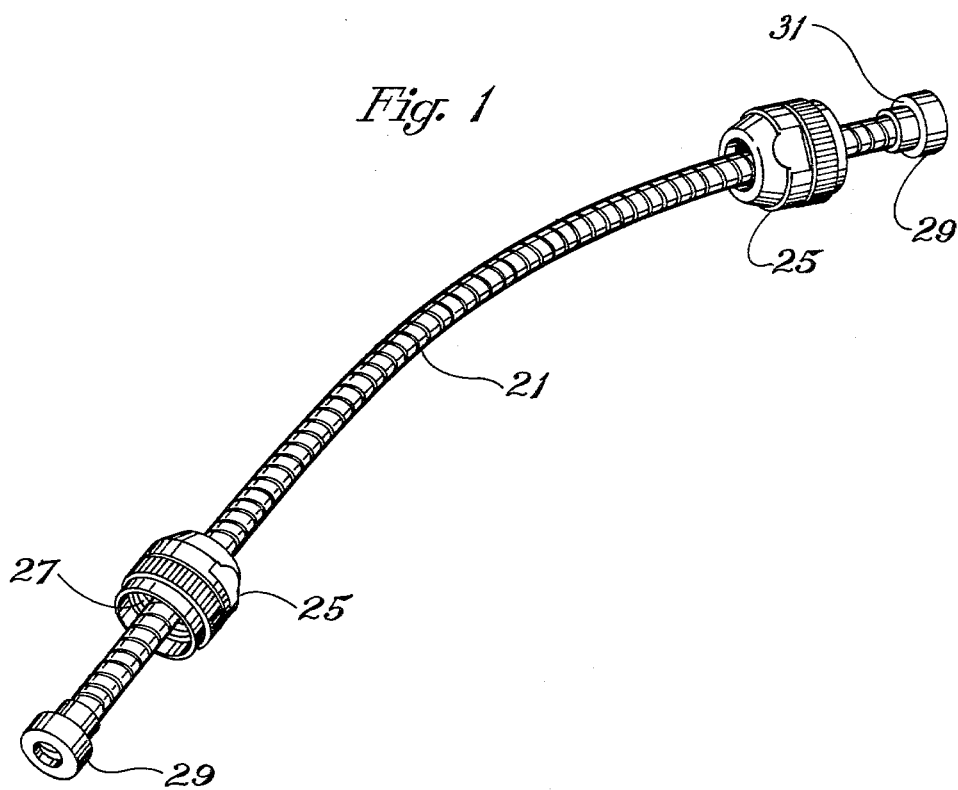

FLEXIBLE TUBE TERMINATING MEANS

BACKGROUND OF THE INVENTION

1. Field of the Invention

The present invention relates to a flexible tube terminating means for holding a threaded coupling member and a method of forming the terminating means.

SUMMARY OF THE INVENTION

It is an object of the present invention to provide a tube terminating means that can be attached to tubes of different diameters.

It is a further object of the present invention to provide a method of attaching a terminating means to a tube.

The terminating means comprises a fitting connected around the end portion of a tube and which has a shoulder for engagement by an annular threaded coupling member located around the tube. The fitting is formed by one member which engages the end of the tube and holds a second member in place while both members are attached together and to the tube by heat fusible means located in an annular cavity formed between the two members and around the tube.

BRIEF DESCRIPTION OF THE DRAWINGS

FIG. 1 is a perspective view of a flexible tube with terminating means attached to opposite ends for engagement by threaded coupling members located around the tube.

FIG. 2 is a cross section of one embodiment of the tube terminating means of the present invention.

FIG. 3 is a cross section of another embodiment of the tube terminating means of the present invention. In FIG. 3, a threaded coupling member is shown located around the tube.

DESCRIPTION OF THE PREFERRED EMBODIMENTS

Referring now to FIGS. 1–3 of the drawings, reference numeral 21 identifies a flexible metallic tube having an opening 23 formed therethrough for receiving electrical leads and which is employed to protect the leads and also to provide RF and EMI shielding. Located around the tube 21 are two annular female coupling members 25 having internal threads 27 for coupling opposite ends of the tube 21 to male threaded members (not shown) of two connectors of electrical equipment or devices between which the electrical leads extend. Attached to each end of the tube 21 is a terminating member means or fitting 29 having an exterior shoulder 31 for engagement by a mating internal shoulder 33 formed on the inside of the coupling member 25 for securely connecting the ends of the tube to the connectors.

Referring to the embodiment of FIG. 1, the terminating member means or fitting 29 is formed by an annular metallic sleeve 41 having an opening 43 formed therethrough for receiving the tube 21. The sleeve 41 comprises a large diameter portion 41A at the end 21A of the tube 21 and a smaller diameter portion 41B extending from portion 41A defining the shoulder 31 therebetween. The opening 43 of the sleeve 41 is enlarged at 43A defining an annular cavity 45 surrounding the tube 21 near its end 21A. An annular metallic washer 47 having an opening 49 formed therethrough engages the end 21A of the tube 21 and has its outer periphery 51 attached to sleeve 41. Attachment may be by tack welding or swaging. The welded or swaged portion is illustrated at 59. Opening 49 of washer 47 has a diameter about equal to that of opening 23 of tube 21. Washer 47 and the wall 53 of sleeve 41 form the front and rear ends respectively of the cavity 45. Located in the cavity are two ring shaped silver solder members 55 which when fused, bond washer 47 and sleeve 41 together and to the tube 21 to fixedly attach the terminating means or fitting 29 around the end of the tube 21.

In the assembly process, the washer 47 is attached to the sleeve 41 as shown, by welding or swaging; the silver solder rings 55 are inserted in the cavity 45 and the tube 21 then is inserted into the opening 43 until its end 21A engages the washer 47. The tube 21 with a sleeve 41, washer 47, and solder rings 55 assembled at one or both of its ends then is inserted into a furnace for a suitable time to fuse or melt the solder and braze or solder the washer 47 and sleeve 41 together and to the tube 21. The furnace is heated to a suitable brazing temperature and a gaseous flux is employed to facilitate brazing. After the brazing operation, the front welded or swaged portion 59 is then ground off to form a flat surface for the terminating means.

The washer 47 holds the sleeve 41 in place on the tube 21 during the brazing operation, thereby eliminating the need of special clamps or jigs or the requirement that there be a tight fit between the tube 21 and the sleeve 41. Thus a given sleeve 41 and washer 47 may be employed to form a terminating means for tubes having different diameters.

Each of the silver solder rings 55 preferably has a small gap formed therethrough to facilitate proper insertion into the cavity 45. The cavity 45 holds and confines the solder yet allows proper bonding to take place.

In the embodiment of FIG. 3, the terminating means or fitting 29 is formed by a metallic sleeve 61 and an annular metallic member 63. The sleeve 61 has an opening 65 formed therethrough for receiving the tube 21. It has a small diameter portion 67 which flanges outward to form a larger diameter portion 69. Annular member 63 has an opening 71 formed through front portion 73. The diameter of opening 71 is about the same as that of opening 23 of tube 21. The inside diameter of member 63 at 75 is enlarged to define the outer limits of cavity 45. The inside diameter of member 63 is enlarged further at 77 to receive flange 69. The flange 69 of sleeve 61 is attached to the back end of annular member 63 by tack welding or swaging shown at 79. The front wall 81 of sleeve 61 and the wall 83 of front portion 73 of member 63 form the rear and front ends of cavity 45.

In the assembly process, flange 69 of sleeve 61 is located in opening 77 of member 63 and attached to memeber 63 by tack welding or swaging. The solder rings 55 are located in the cavity 45 and the tube 21 inserted into the fitting until its end 21A engages wall 83 of member 63. The tube 21 with a sleeve 61, annular member 63 and solder rings 55 assembled at one or both ends thereof then is inserted into a furnace for brazing the sleeve 61 and member 63 together and to the tube 21 to form the fitting or terminating means 29. The welded or swaged portion 79 may be ground off to form a flat annular shoulder 31 for engagement by the shoulder 33 of coupling member 25.

The front portion 73 of member 63 performs the same function as washer 47 in holding the fitting in place during brazing whereby the fitting may be attached to tubes 21 of different diameters. The cavity 45 confines the solder during assembly and after the brazing operation.

I claim:

1. A fitting located around the end portion of a tube and having a shoulder for engagement by a threaded coupling member, said fitting having a first annular portion located around the end of said tube and a second annular portion located around said tube and extending from said first annular portion, said first annular portion having a diameter greater than that of said second annular portion defining said shoulder therebetween, comprising:

first and second annular members attached together and to said tube by fused metallic means, said first annular member comprising annular means connected to said first annular portion and defining a generally flat annular surface engaging the end face of the terminal end of said tube and extending radially outward therefrom defining one end of an annular cavity surrounding the exterior of said tube, said second annular member comprising an annular portion connected to said second annular portion and spaced axially inward from said generally flat annular surface of said annular means and defining an opposite end of said cavity spaced axially inward from said one end of said cavity, said fused metallic means being located in said cavity bonding said first and second annular members together and to said tube.

2. The fitting of claim 1, wherein:

said first annular portion is formed on said first annular member, said second annular portion is formed on said second annular member, said first annular member has an inner annular wall defining the outer annular wall of said annular cavity, said generally flat annular surface extends radially inward from said inner annular wall of said first annular member.

3. A method of attaching a fitting around the end portion of a tube, said fitting having a shoulder for engagement by a threaded coupling member, said fitting having a first annular portion located around the end of said tube and a second annular portion located around said tube and extending from said first annular portion, said first annular portion having a diameter greater than that of said second annular portion defining a shoulder for engagement by a threaded coupling member, comprising the steps of:

coupling first and second annular members to the end portion of said tube with fusible metallic means located in an annular cavity formed therebetween, said first annular member comprising annular means connected to said first annular portion and defining a generally flat annular surface engaging the end face of the terminal end of said tube and extending radially outward therefrom defining one end of said annular cavity surrounding the exterior of said tube, said second annular member comprising an annular portion connected to said second annular portion and spaced axially inward from said generally flat annular surface and defining an opposite end of said annular cavity spaced axially inward from said one end of said cavity, and fusing said metallic means to bond said first and second annular members together and to said tube.

4. The fitting of claims 1 or 2, wherein:

said end face of said terminal end of said tube is located in a given plane, said generally flat annular surface of said annular means engages said end face of said terminal end of said tube in said given plane.

5. The method of claim 3, wherein:

said end face of said terminal end of said tube is located in a given plane, said coupling step being carried out by engaging said generally flat annular surface of said annular means with said end face of said terminal end of said tube in said given plane, said fusing step being carried out by bonding said first and second annular members together and to said tube with said generally flat annular surface of said annular means engaging said end face of said terminal end of said tube in said given plane.

6. A fitting located around the end portion of a tube and having a shoulder for engagement by a threaded coupling member, said fitting having a first annular portion located around the end of said tube and a second annular portion located around said tube and extending from said first annular portion, said first annular portion having a diameter greater than that of said second annular portion defining said shoulder therebetween, comprising:

washer means and an annular member attached together and to said tube by fused metallic means, said washer means having a generally flat surface engaging the end face of the terminal end of said tube and extending radially outward therefrom defining one end of an annular cavity surrounding the exterior of said tube, said first and second annular portions and said shoulder being formed on said annular member, said annular member having an inner annular wall defining the outer annular wall of said annular cavity, said annular member comprising an annular surface spaced axially inward from said washer means and defining an opposite end of said cavity spaced axially inward from said one end of said cavity, said fused metallic means being located in said cavity bonding said washer means and said annular member together and to said tube.

7. The fitting of claims 1, 2 or 6 wherein:

said end face of said terminal end of said tube is located in a given plane, said one end of said annular cavity being in the same plane as said end face of said terminal end of said tube.

8. The method of claims 3 or 5 wherein:

said end face of said terminal end of said tube is located in a given plane, said one end of said annular cavity being in the same plane as said end face of said terminal end of said tube.

* * * * *